United States Patent [19]

Banks et al.

[11] Patent Number: 4,998,294
[45] Date of Patent: Mar. 5, 1991

[54] OPTO-ELECTRICAL POWER TRANSMISSION AND CONTROL SYSTEM

[75] Inventors: Franklin J. Banks, Leucadia, Calif.; Kenneth D. Garnjost, Buffalo, N.Y.

[73] Assignee: Moog Inc., East Aurora, N.Y.

[21] Appl. No.: 309,201

[22] PCT Filed: Jul. 1, 1987

[86] PCT No.: PCT/US87/01598
§ 371 Date: Dec. 22, 1988
§ 102(e) Date: Dec. 22, 1988

[87] PCT Pub. No.: WO88/04868
PCT Pub. Date: Jun. 30, 1988

[51] Int. Cl.[5] ............................................. H04B 10/12
[52] U.S. Cl. .................................. 455/612; 455/603; 455/605; 340/870.29
[58] Field of Search .................. 340/870.28, 870.29; 455/600, 603, 605, 606, 607, 608, 612, 617, 619

[56] References Cited

U.S. PATENT DOCUMENTS

| | | | |
|---|---|---|---|
| 3,885,231 | 5/1975 | Gaddy | 455/603 |
| 4,326,298 | 4/1982 | FRomm | 455/617 |
| 4,710,977 | 12/1987 | Lemelson | 455/603 |
| 4,731,879 | 3/1988 | Sepp | 455/605 |
| 4,742,573 | 5/1988 | Popvic | 455/605 |
| 4,837,556 | 6/1989 | Matsushito | 455/605 |
| 4,905,309 | 2/1990 | Maisonneuve | 455/603 |

FOREIGN PATENT DOCUMENTS

60-11735 6/1985 Japan ..................... 455/612

Primary Examiner—Reinhard Eisenzopf
Assistant Examiner—L. Van Beck
Attorney, Agent, or Firm—Sommer, Oliverio & Sommer

[57] ABSTRACT

A lase diode light source (21) is arranged to emit light of a desired intensity ($I_1$), which is transmitted via an optical conductor (22). Light exiting the fiber has an intensity ($I_2$), and falls incident on the receiver surface of a photodiode (23). Such transmitted light provides both the power and control for operating a load (24). The load has a maximum impedance such that the maximum load input voltage required to produce the maximum desired load current does not exceed the forward conductive breakdown voltage of the photodiode.

29 Claims, 2 Drawing Sheets

LIGHT MODULATION   SIGNAL VOLTAGE   AMPLIFIER POWER VOLTAGE

OPTO-ELECTRICAL POWER TRANSMISSION AND CONTROL SYSTEM

TECHNICAL FIELD

This invention relates generally to the field of servosystems, and, more particularly, to an improved system for optically transmitting power to, and proportionally controlling the operation of, a remote electrical load, such as the torque motor of a servovalve.

BACKGROUND ART

Aircraft flight control surfaces (e.g., flaps, rudder, ailerons, elevators, etc.) are typically controlled by electrohydraulic servoactuators operating in closed-loop position servosystems. Such systems determine the error between a commanded position and an actual position, and operate the servoactuator so as to reduce or eliminate the error.

The conventional two-stage servovalve typically has an electrical section and a hydraulic section. The electrical section includes a torque motor which is arranged to produce a proportional pivotal displacement of an armature-flapper member in response to an input current. The armature-flapper member is commonly mounted on a substantially frictionless flexure tube. Hence, an input current of one polarity will displace the flapper in one angular direction, while a current of the opposite polarity will displace the flapper in the opposite direction. In the hydraulic section, the flapper portion is movable between two spaced, facing nozzles. Thus, as the torque motor causes the flapper to move closer to one nozzle and farther from the other, back pressures are developed in the fluid conduits leading to these nozzles. The differential of these back pressures is, in turn, used to selectively displace a second-stage valve spool relative to a body to create the desired flow(s) through the valve. The valve may also include a mechanical feedback wire which functions to urge the flapper back toward a centered or null position between the nozzles when the spool is in the commanded position. Such servovalves are commonly used to control the flows of fluid with respect to the opposing chambers of a double-acting fluid-powered actuator. Additional details as to the structure and operation of such a servovalve are more fully shown and described in U.S. Pat. No. 3,023,782, the aggregate disclosure of which is hereby incorporated by reference.

In aircraft, the servovalve is typically located immediately adjacent the actuator. This has required long lengths of electrical conductors from the source of the command signal (typically, the cockpit) to the servovalve site. Moreover, it is common to use redundant control systems such that, should there be a failure of one conductor, effective control of the servovalve may still be maintained through the other undisturbed conductive paths. Indeed, many aircraft employ quad-redundant systems, in which four conductors follow physically separate paths from the command source to the servovalve. The length of such conductors, magnified by the extent to which redundancy is provided, has posed a problem in that such conductors are susceptible to electro-magnetic interference, such as lighting and the like. Any interference with the command signal can cause unintended servoactuator response.

To render such systems less susceptible to electro-magnetic interference, others have proposed to control the servovalve by an optical technique. This generally contemplates the transmission of an optical command signal, controlled by a pulse-width-modulated technique, along one or more optical fibers from the cockpit to the servovalve. While this has been conceptually feasible, it has not wholly solved the problem because there has still been a need to provide an electrical conductor to power the servovalve-driving amplifier or controller in response to such optically-transmitted command signal. For example, U.S. Pat. No. 4,422,180 appears to disclose a servosystem control system for aircraft applications, in which a command signal is transmitted optically to a remote servosystem. However, this system also contemplates the simultaneous transmission of electrical power via one or more conventional conductors to various parts and components of the system, such as a receiver, a demodulator, a processor, and servoamplifier. Thus, in this type of system, the command signal was transmitted optically, but electrical power was transmitted via conventional conductors.

Other details of known systems for transmitting optical command data between a source and a receiver, are shown in U.S. Pat. Nos. 4,313,226, 4,495,655, and 4,538,655.

DISCLOSURE OF THE INVENTION

The present invention broadly provides an improved opto-electrical power transmission and control system, and method of operating same, for proportionally controlling the operation of an electrical load (e.g., a torque motor, a force motor, or the like) in response to the intensity of transmitted light. Thus, both the command signal and the power needed to operate the load are transmitted optically, and the need for conventional electrical conductors between the command source and the load is wholly eliminated.

In one aspect, the improved system broadly includes: a light source operatively arranged to selectively emit light at a controllable intensity; a plurality (i.e., one or more) of photodiodes, each diode having a receiver surface operatively arranged to be illuminated by incident light emitted by the source and having an electrical output; and an electric power-consuming load connected to the output of each photodiode, the load having an output proportional to its input current, the load also having a maximum impedance such that the maximum load input voltage required to produce the maximum desired load current does not exceed the forward conductive breakdown voltage of each photodiode, whereby the output of the load will be proportional to the intensity of light emitted by the source. The outputs of the photodiode(s) may be connected to a single load or to multiple loads.

In another aspect, the improved system broadly includes: a first photodiode having a first receiver surface and having a first electrical output arranged to produce a first current when the first receiver surface is illuminated; a second photodiode having a second receiver surface and having a second electrical output arranged to produce a second current when the second receiver surface is illuminated, the second diode output being connected in parallel with the first diode output such that the first and second currents will oppose one another in the load; an electric power-consuming load connected to the first and second photodiode outputs, the load having a maximum impedance such that the maximum load input voltage required to produce the maximum desired load current does not exceed the forward conductive breakdown voltage of either of said photodiodes; and means for selectively and controllably illuminating the first and second receiver surfaces on a mutually-exclusive basis to create a current of desired polarity and magnitude in the load.

In still another aspect, the improved system broadly includes: a power light source for selectively emitting light at a controllable intensity; a first photodiode having a first receiver surface arranged to be illuminated with light from the power source and operative to produce an electrical output in response to such received light; an electric power-consuming load arranged to receive the output of the first photodiode, the load having an output proportional to input current, the load having a maximum impedance such that the maximum load input voltage required to produce the maximum desired load current does not exceed the forward conductive breakdown voltage of the first photodiode; an electrically-operated switch interposed between the first photodiode and load for selectively causing the magnitude of the electrical output of the first photodiode to have a desired polarity; a signal light source for selectively emitting light at a controlled intensity; a second photodiode having a second receiver surface arranged to be illuminated with light from the second source and operative to produce an electrical output in response to such incident light; and a controller arranged to received the second photodiode electrical output and to operate the switch in response to some parameter (e.g., intensity) of the incident light; whereby the current in the load will have a magnitude substantially proportional to the intensity of light generated by the power source, and will have a polarity determined by the intensity of light generated by the signal source.

The light sources may, for example, be laser diodes, or the like. The light-receiving photodiodes may be of a gallium arsenide composition. The load may be an electrical motor, a torque motor, a force motor, a heating resistance, or the like.

The invention also comprehends the methods provided by such systems.

Accordingly, the general object of the invention is to provide an improved opto-electrical power transmission system in which the power to operate a load is transmitted optically.

Another object is to provide an improved opto-electrical control system for proportionally controlling the operation of a load having an output (e.g., speed of rotation, torque, force, heat, etc.) substantially proportional to its input current.

Still another object is to provide an improved opto-electrical power transmission and control system in which the power to operate a load, and the signal to control such operation, are transmitted optically.

These and other objects and advantages will become apparent from the foregoing and ongoing written specification, the drawings, and the appended claims.

MODE(S) OF PRACTICING THE INVENTION

At the outset, it should be clearly understood that like reference numerals are intended to identify the same structural elements, portions, or surfaces consistently throughout the several drawing figures, as such elements, portions or surfaces may be further described or explained by the entire written specification, of which this detailed description is an integral part. Unless otherwise indicated, the drawings are intended to be read (e.g., cross-hatching, arrangement of parts, proportion, degree, etc.) together with the specification, and are to be considered a portion of the entire "written description" of this invention, as required by 35 U.S.C. §112. As used in the following description, the terms "horizontal", "vertical", "left", "right", "up" and "down", as well as adjectival and adverbial derivatives thereof (e.g., "horizontally", "rightwardly", "upwardly", etc.), simply refer to the orientation of the illustrated structure as the particular drawing figure faces the reader. Similarly, the terms "inwardly" and "outwardly" generally refer to the orientation of a surface relative to its axis of elongation, or axis of rotation, as appropriate.

Referring now to the drawings, this invention broadly provides improved apparatus for, and methods of, optically transmitting both power and control for proportionally controlling the operation of an electric power-consuming load, perhaps at a remote location, in response to light emitted from a source. However, before discussing the structure and operation of the inventive apparatus and methods, it is deemed advisable to review an existing opto-electrical control system.

Figure 1:
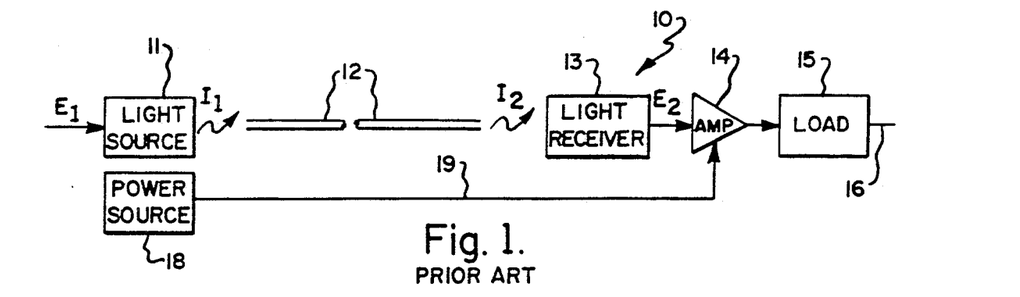
FIG. 1 is a simplified block diagram of a prior art system in which the control signal was transmitted optically, but the load-driving electrical power was transmitted via a conventional electrical conductor.

PRIOR ART DEVICE (FIG. 1)

FIG. 1 is a block diagram of a known control system, such as representatively shown and described in U.S. Pat. No. 4,422,180. This system, generally indicated at 10, broadly includes: a light source 11 (e.g., a light-emitting diode, a laser diode, or the like) operatively arranged to emit light of intensity $I_1$ in response to an input electrical signal $E_1$. Such emitted light is appropriately controlled (e.g., as by a pulse-frequency-modulation or pulse-width-modulation technique), and is transmitted along an optical fiber or conductor 12 to illuminate the receiver surface of a photodiode 13. The light exiting the optical fiber is schematically indicated as having an intensity $I_2$. The photodiode converts such received light into an output electrical signal $E_2$, which is then amplified by an amplifier 14 and then supplied as the electrical input to a load 15, such as the torque motor of a servovalve (not shown), having an output, schematically indicated at 16.

However, the electrical power needed to operate amplifier 14 is supplied by a suitable external power source 18 (e.g., a generator powered by an aircraft propulsion plant, an auxiliary turbine, a battery, or a slip-stream turbine) via a conventional electrical conductor 19. Thus, in this known system, the control signal is transmitted optically between the source and the receiver, but the electrical power for operating the load in response to such control signal is transmitted via one or more conventional electrical conductors.

The invention disclosed herein differs from this prior art system by providing an improved system in which the power signal and the control signal are both transmitted in the form of light, and are used to proportionally control the operation of an electric power-consuming load in response to the intensity of light emitted from one or more sources. In order to facilitate such proportional control, it is presently preferred that the output of the load be substantially proportional to its input current. Several embodiments of the invention will now be described.

Figure 2:
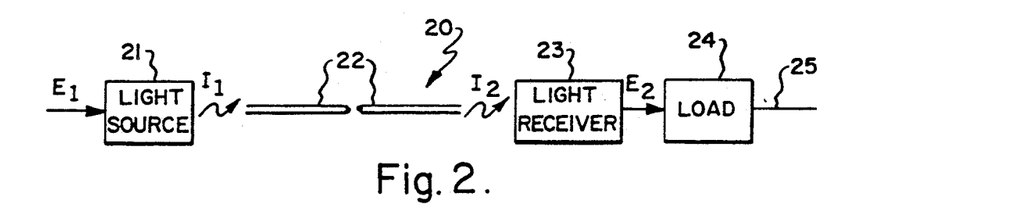
FIG. 2 is a simplified block diagram of a first form of the improved system, in which the control signal and the power signal are both transmitted optically.

FIRST EMBODIMENT (FIG. 2)

FIG. 2 is a block diagram of a first form of the improved system. This system, generally indicated at 20, broadly includes: a light source 21 (e.g., a laser diode, or the like) operatively arranged to selectively transmit light of controllable intensity $I_1$ in response to an electrical signal $E_1$. Alternatively, the intensity of such emitted light may be modified or otherwise controlled downstream of the source. In any event, such emitted light is then transmitted by an optical fiber or conductor 22 to illuminate the receiver surface of at least one photodiode 23. The light exiting optical fiber 22 is again indicated as having an intensity $I_2$. At the present time, photodiodes of gallium arsenide are preferred because of their relatively-high opto-electrical efficiencies, as compared with earlier forms of such devices. However, it should be understood that the invention is not limited to use with only gallium arsenide photodiodes, and may employ other photodiodes, whether now-existing or hereinafter developed. In any event, such incident light causes photodiode 23 to produce an electrical output $E_2$, which in turn supplied directly to the load 24. This electrical output signal $E_2$, has a voltage $e_2$ and a current $i_2$. The load is schematically indicated as having an output 25. As used herein, the term "load" is intended in a broad generic sense to include various types of electro-magnetic devices, such as torque motors, force motors, and other devices (e.g., heating resistances, etc.) in which the load output, whatever its form (e.g., torque, force, rotational speed, heat, etc.), is substantially proportional to the load input current. Thus, while the preferred embodiments may describe such load as being a torque motor, such as used to control a servovalve (not shown), it should be clearly understood that this is only one species example of a broader class and type of such loads.

In the improved system, both the power to drive the load as well as the signal for controlling its operation, are transmitted in the form of light between the source 21 and the photodiode 23. This has the distinct advantage of eliminating the need to provide load-driving electrical power via a separate conventional conductor, as in the prior art.

If it is desired to control the load output 25 substantially proportionally in response to the intensity of light emitted by the source, $I_1$, then each of the intermediate elements between the source and the output shaft must have a constant gain (or complementary gains) so that the overall transfer function of the system (i.e., the product of the gains of all feed-forward components) will also be a constant.

To some extent, the operational feasibility of the improved system has been made possible by the recent development of gallium arsenide diodes, and the like, which offer an order-of-magnitude improvement in efficiency (i.e., $E_2/I_2$) over those previously available. While the efficiency of such gallium arsenide photodiodes may be on the order of 50%, the linearity of their gains is possible only if the designer appreciates that there is a point at which the photodiode will become saturated with incident light. In other words, beyond this point, the diode will not respond to increased intensity of incident light.

Figure 3:
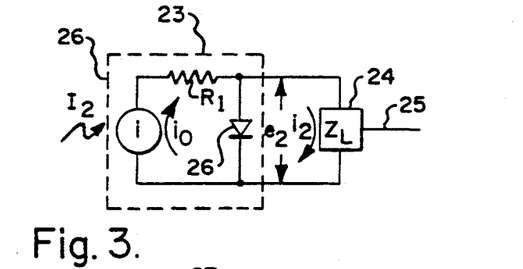
FIG. 3 is an "equivalent circuit" electrical schematic of a photodiode associated with a load.

FIG. 3 is an "equivalent circuit" electrical schematic of photodiode 23 connected to the load 24. Incident light of intensity $I_2$ illuminates the receiver surface 26 of the photodiode. This causes the photodiode to generate an internal current $i_0$, which passes through the internal resistance $R_1$ of the photodiode. The photodiode also acts as though it has a diode 26 in parallel with the load 24. The load is depicted as having an impedance $Z_L$. Thus, the photodiode is depicted as producing an output voltage $e_2$ which causes a current $i_2$ in the load. As long as the photodiode output voltage $e_2$ is less than the forward conductive breakdown voltage of the photodiode, the internal diode 26 acts as though it were open. However, at and above the forward conductive breakdown voltage, diode 26 will become conductive. Hence, increased light intensity will not thereafter produce a proportional current $i_2$ in the load.

Figure 4:
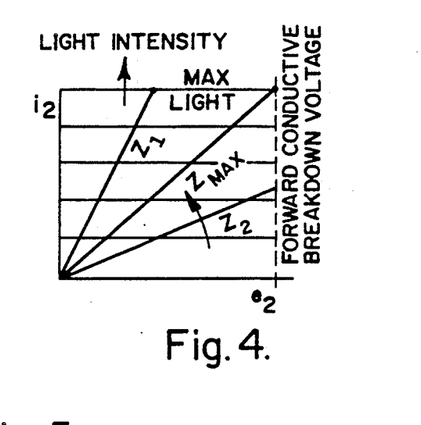
FIG. 4 is a graph of output current vs. output voltage of a gallium arsenide photodiode, for various load impedance.

This is graphically illustrated in FIG. 4, which is a plot of load current $i_2$ vs. photodiode output voltage $e_2$, for various values of load impedance. The horizontal lines represent lines of constant current. From this, it will be seen that the photodiode will produce a current proportional to incident light intensity until the photodiode output voltage exceeds the forward conductivity breakdown voltage of the photodiode, this being represented by the dashed line in FIG. 4. The maximum load impedance (i.e., the curve labeled "$Z_{max}$") for proportional response is indicated as being that output voltage which is substantially equal to the forward conductive breakdown voltage, and which, in turn, produces the maximum current $i_2$. If additional light is received above this limit, the photodiode will not produce a current proportional to the intensity of such incident light. The curve labeled "$Z_1$" represents another load impedance at which the maximum desired current, say $i_2$, will be generated at less than the forward conductive breakdown voltage of the photodiode. Conversely, the curve labeled "$Z_2$" represents another load impedance for which the photodiode will reach its forward conductive breakdown voltage without producing such desired current $i_2$. Thus, the load must be carefully matched, by proper design and/or selection of the maximum load impedance, to the properties and characteristics of a particular photodiode, be it gallium arsenide or some other material, in order to achieve proportionality of response. If this is done properly, a system can be designed which will uniquely allow both power and control to be transmitted in turns of light energy from a light source to one or more photodiodes, all with the object of proportionally controlling the output of the load in response to the intensity of light emitted by the source.

Figure 5:
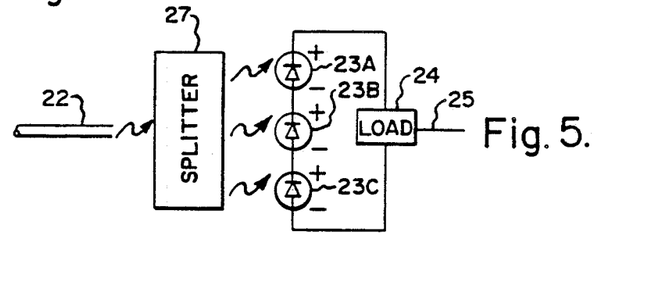
FIG. 5 is a block diagram of a portion of a second form of the improved system, in which light exiting a fiber is directed to fall upon the receiver surfaces of three photodiodes having their electrical outputs arranged to be series-aiding with respect to the load.

FIG. 5 is a block diagram of a portion of a system, in which light exiting an optical fiber, again indicated at 22, is directed to fall upon the individual receiver surfaces of a number of photodiodes, severally indicated at 23A, 23B and 23C, which have their electrical outputs connected so as to be series-aiding with respect to the load 24. To effect this, a splitter 27 may be positioned between the light fiber 22 and each of the photodiodes, so as to transmit exiting light to the receiver surface of each photodiode. In this arrangement, the individual voltages provided by the several photodiodes will be summed across the load. Here again, the load should have a maximum impedance such that the maximum load input voltage needed to produce the maximum desired load current will not exceed the sum of the forward conductive breakdown voltages of the photodiodes. While this arrangement is shown as having three photodiodes arranged so as to be series-aiding, persons skilled in this art will readily appreciate that any greater or lesser number may be used to achieve the desired summed voltage.

Figure 6:
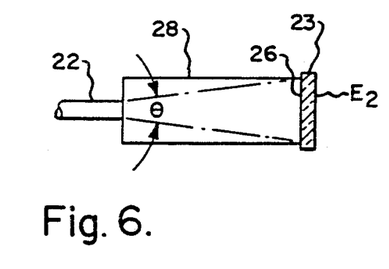
FIG. 6 is a schematic longitudinal sectional view of a portion of an improved system, showing a coupling lens operatively arranged between an optical fiber and a photodiode.

FIG. 6 is a schematic view of a portion of another improved system, in which a coupling lens 28 is operatively arranged between the end of an optical fiber 22 and the receiver surface 26 of a photodiode 23. The coupling lens may be butt-bonded to the photodiode and the fiber by means of a suitable optical epoxy or the like. The coupling lens is shown as being a horizontally-elongated cylindrical rod, and has a selected length and is formed of a material having a desired index of refraction, such that light exiting the fiber will diverge at an angle $\theta$ to substantially just cover the entire area of the receiver surface. The typical conductive diameter of the fiber may be on the order of about 0.004 inches [0.1016 mm] inches and the diameter of the receiver surface may be on the order of 0.120 inches [3.048 mm], although this may readily be changed as desired.

Figure 7:
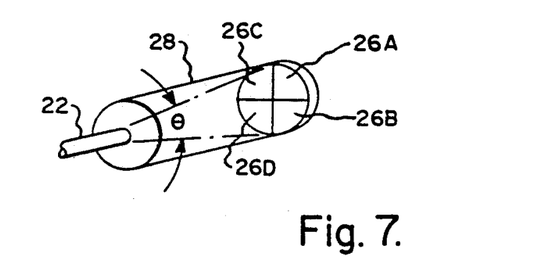
FIG. 7 is a perspective schematic view of such coupling lens, and further showing the receiver surface of a photodiode as having been segmented into quadrants so as to produce a plurality of smaller photodiodes, the outputs of which may be connected in series-aiding manner.

FIG. 7 is a perspective schematic of the coupling lens shown in FIG. 6, but depicts the receiver surface of the photodiode as having been sectioned or segmented so as to subdivide the same into a number of smaller photodiodes. Each of these smaller diodes is shown as having an individual receiver surface 26A, 26B, 26C, 26D. Each of the smaller photodiodes produces an individual output, and these may, if desired, be connected in a series-aiding manner, as shown in FIG. 5.

In some applications, it may be desired to control the polarity of the current generated by the photodiode(s) apart from its magnitude. For example, the magnitude of torque produced by a torque motor is substantially proportional to the magnitude of the input current, but the direction of such torque is related to the polarity of such current. Analogous situations exist with respect to other species of motors having bidirectional outputs. With these types of loads, it may be desired to control the polarity of the photodiode output current independently of its magnitude.

Figure 8:
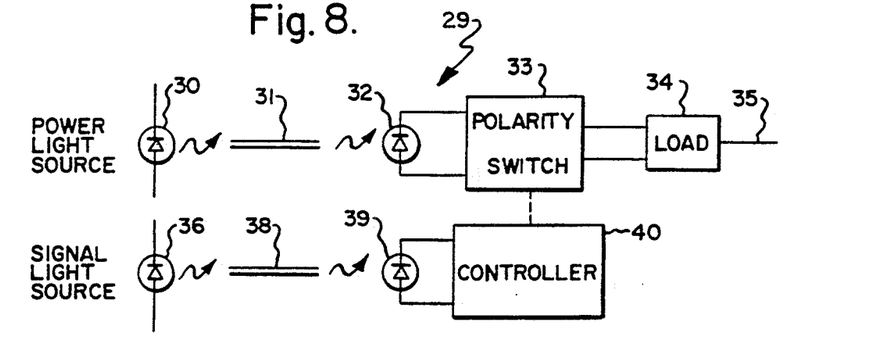
FIG. 8 is a block diagram of a third form of an improved system for controlling the polarity of the load current independently of its magnitude.

FIG. 8 schematically illustrates one manner in which this can be done. This system, generally indicated at 29, is shown as broadly including a power light source 30 (e.g., a laser diode, or the like), a first optical fiber or conductor 31, a first photodiode 32, and a polarity switch 33 operatively interposed between the electrical output of first photodiode 32 and a load 34. The load is shown as having an output 35. The system also includes a second signal light source 36 (e.g., a laser diode, or the like), a second optical fiber or conductor 38, a second photodiode 39, and a controller 40 operatively connected to the electrical output of second photodiode 39 and arranged to operate polarity switch 33. Thus, the power light source 30 may be caused to emit light of variable intensity, which is transmitted through optical fiber 31 to the receiver surface of first photodiode 32. The magnitude of the load current will be proportional to the electrical output of first photodiode 32. The signal light source is used to transmit a control signal for operating the polarity switch. Thus, signal light source 36 may emit light, suitably controlled or modulated, and then be transmitted via optical fiber 38 to second photodiode 39. Controller 40 is arranged to receive the output of second photodiode 39, and to operate the polarity switch so as to prefix the magnitude of the current generated by first photodiode 32 with the desired polarity.

Figure 9:
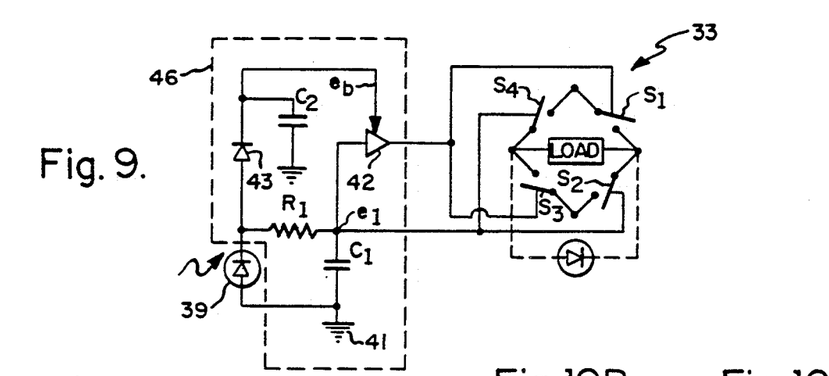
FIG. 9 is an electrical schematic of the polarity switch and controller shown in FIG. 8.
Figure 10A:
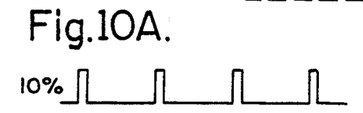
FIGS. 10A, 10B, 10C, 10D, 10E and 10F are plots showing the outputs of the photodiode, as a function of input optical signal.
Figure 10B:
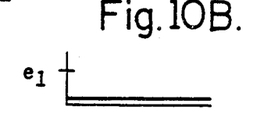
Figure 10C:
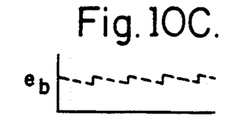
Figure 10D:
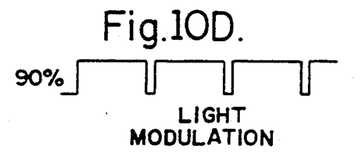
Figure 10E:
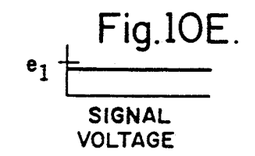
Figure 10F:
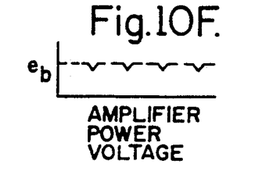

FIG. 9 is an electrical schematic of the controller and polarity switch shown in FIG. 8. The electrical output terminals of second photodiode 39 are connected by a resistor $R_1$ and a capacitor $C_1$. The node between capacitor $C_1$ and the appropriate photodiode terminal is grounded, as indicated at 41. Thus, the R-C circuit acts as a filter. The node between photodiode 39 and resistor $R_1$ supplies power to an operational amplifier 42 through a diode 43. The node between diode 43 and amplifier 42 is connected to a grounded capacitor $C_2$, which acts as a rectifier. Thus, a rectified voltage $e_b$ is supplied to provide power to amplifier 42. The node between resistor $R_1$ and capacitor $C_1$ is supplied as the input to amplifier 42. Persons skilled in this art will appreciate that when the input of amplifier 42 is high, the output thereof will be low, and vice versa. The polarity switch 33 is shown as including four electrically-operated semiconductor switches, $S_1, S_2, S_3$ and $S_4$, operatively arranged in a bridge circuit with respect to the load. The output from amplifier 42 is arranged to operate switches $S_1$ and $S_3$, which form one cooperative pair, whereas the input to amplifier 42 is arranged to operate switches $S_2$ and $S_4$ which form a second cooperative pair thereof. Thus, when the input to amplifier 42 is low, switches $S_2$ and $S_4$ will be opened, and switches $S_1$ and $S_3$ will be closed. However, when the input to amplifier 42 is high, switches $S_1$ and $S_3$ will be closed, and switches $S_2$ and $S_4$ will be opened. If hexfet switches are used, the value of $e_b$ should be about 5 volts.

FIG. 10 illustrates the voltage available at the node between resistor $R_1$ and capacitor $C_1$ for two alternative pulse-width-modulated light signals (i.e., 10% or 90%) received by photodiode 39. Thus, these light signals may be used to selectively control the two cooperative pairs of switches in the bridge circuit, all with the object of selectively causing the current to flow in the desired direction through the load. However, for either light input condition, the amplifier power voltage $e_b$ will be substantially the same because of the very low power current flow.

Figure 11:
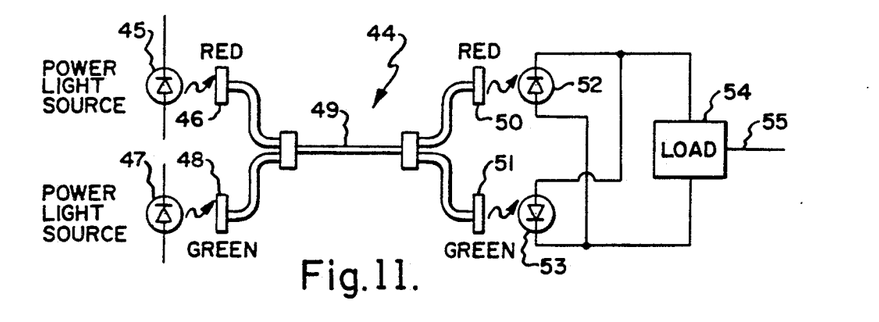
FIG. 11 is a schematic of still another improved system for controlling the polarity of the load current independently of its magnitude.

FIG. 11 is a schematic view of another system in which load current polarity and magnitude may be controlled. This system has parallel opposing photodiodes with separate light inputs. More particularly, this system, generally indicated at 44, is shown as including a power light source (e.g., a laser diode) 45, operatively arranged to produce light of variable intensity and to supply the same to a color filter 46. This system also includes a signal light source 47 (e.g., a laser diode), which is arranged to supply light through a different color filter 48. For illustrative purposes, filter 46 is indicated as being a red filter, and filter 48 is indicated as being a green filter. In any event, light passing through these two filters 46,48 is then transmitted along a single optical fiber or conductor 49. At the distal end of such filter, the light is then separated by means of another red filter 50 and a green filter 51. Such transmitted light passing through red filter 50 is then directed to the receiver surface of a first photodiode 52. Such transmitted light as may pass through green filter 51 is transmitted on to the receiver surface of a second photodiode 53. These two photodiodes are arranged in parallel with a load 54 having an output 55. However, the two photodiodes are arranged so as to produce currents of opposite polarity in the load. Thus, by selectively causing either power light source 45,47 to emit light at the desired intensity, a current of desired polarity and magnitude may be created in the load.

Persons skilled in this art will readily appreciate that many varied and different changes may be made. For example, the invention is not limited to use with gallium arsenide photodiodes, unless an express limitation to that effect appears in the appended claims. Similarly, other types of light and signal sources may be used. The light source(s) and light receiver(s) may, if desired, be separated by one or more optical fibers or conductors, but this need not invariably obtain. The various forms of the system are readily adaptable to redundant operation. As previously indicated, the load may be, for example, a torque motor, a rotational motor, a force motor, or may be a passive resistance heating element, or may be of some other form. In order to obtain proportionality between the load output and the emitted light, it is presently desired that such load have a constant gain. Moreover, in order to achieve such proportionality, the maximum impedance of the load should be such that the maximum voltage produced by the photodiode needed to produce the maximum desired load current will be less than the forward conductive breakdown voltage of each photodiode in the system.

Therefore, while several embodiments of the improved system, and the method of operating the same, have been shown and described, persons skilled in the art will readily appreciate that various additional changes and modifications may be made without departing from the spirit of this invention, as defined and differentiated by the following claims.

We claim:

1. An opto-electrical power transmission and control system for proportionally controlling the operation of an electro-magnetic torque motor in response to the intensity of light emitted from a source, comprising:
   a light source operatively arranged to selectively emit light at a controllable intensity;
   a photodiode having a receiver surface operatively arranged to be illuminated by incident light emitted from said source and having an electrical output; and
   an electro-magnetic torque motor operatively connected to the output of said photodiode, said torque motor having an output proportional to input current, wherein the maximum torque motor input voltage due to resistive and inductive reactance required to produce the maximum desired torque motor current at the maximum, torque motor coil temperature and the maximum torque motor control frequency does not exceed the forward conductive breakdown voltage of said photodiode;
   whereby, the output of said torque motor will be substantially proportional to the intensity of light emitted from said source.

2. An opto-electrical power transmission and control system as set forth in claim 1 wherein said photodiode is formed of a gallium arsenide composition.

3. An opto-electrical power transmission and control system as set forth in claim 1, and further comprising:
   an optical fiber operatively arranged to transmit light emitted from said source to the receiver surface of said photodiode.

4. An opto-electrical power transmission and control system as set forth in claim 3, and further comprising:
   a coupling lens operatively arranged between said photodiode and its said optical fiber.

5. An opto-electrical power transmission and control system as set forth in claim 4 wherein the receiver surface of said photodiode is circular and has one diameter, wherein said optical fiber has a circular transverse cross-section of another diameter, wherein said coupling lens is a cylindrical rod having one end face bonded to an end face of such associated optical fiber and having another end face bonded to the receiver of said photodiode, and wherein the index of refraction and length of said rod are selected such that light exiting said fiber will be directed to substantially just cover the area of said photodiode receiver surface.

6. An opto-electrical power transmission and control system as set forth in claim 1 wherein multiple photodiodes are provided, and wherein said photodiodes have their electrical outputs connected in series-aiding manner with respect to said torque motor, and wherein said torque motor has a maximum impedance such that the maximum torque motor input voltage required to produce the maximum desired torque motor current does not exceed the sum of the forward conductive breakdown voltages of said photodiodes.

7. An opto-electrical power transmission and control system as set forth in claim 6 wherein said multiple photodiodes are formed by sectioning the receiver surface of a single photodiode.

8. An opto-electrical power transmission and control system as set forth in claim 7 wherein said single photodiode has a circular receiver surface and said multiple diodes are formed as segments thereof.

9. An opto-electrical transmission and control system as set forth in claim 1 wherein the electrical power supplied to said torque is derived solely from the electrical output of said photodiode.

10. An opto-electrical power transmission and control system as set forth in claim 1, and further comprising: polarity control means for controlling the polarity of the input current supplied to said torque motor.

11. An opto-electrical power transmission and control system as set forth in claim 10 wherein said polarity control means includes two of said photodiodes, and wherein the electrical outputs of said photodiodes are connected in parallel such that the currents produced at said photodiode outputs will oppose one another in said torque motor, and further comprising means for selectively and controllably illuminating the receiver surface of either photodiode to produce a current of desired polarity and magnitude in said torque motor.

12. The method of transmitting power to, and proportionally controlling the operation of, an electric power-consuming load, the output of which is proportional to its input current, comprising the steps of:
selectively emitting light from a power source;
controlling the intensity of such light emitted by said power source;
illuminating the receiver surface of a first photodiode with light emitted by said power source;
supplying the electrical output of said first photodiode to an electrically-operated switch capable of prefixing said first photodiode electrical output with a desired polarity;
selectively emitting light from a signal source;
illuminating the receiver surface of a second photodiode with light emitted by said signal source; and
operating said switch in response to the electrical output of said second photodiode.

13. An opto-electrical power transmission and control system for proportionally controlling the operation of an electrical load in response to the intensity of light emitted from a source, comprising:
a first photodiode having a first receiver surface and having a first electrical output arranged to produce a first current when said first receiver surface is illuminated with incident light from said source;
a second photodiode having a second receiver surface and having a second electrical output arranged to produce a second current when said second receiver surface is illuminated with incident light from said source, said second photodiode output being connected in parallel with said first photodiode output;
an electrical power-consuming load connected to said first and second photodiode outputs such that said first and second currents will oppose one another in said load, said load having a maximum impedance such that the maximum load input voltage required to produce the maximum desired load current does not exceed the forward conductive breakdown voltage of either of said photodiodes; and
means for selectively and controllably illuminating said first and second receiver on a mutually-exclusive basis to create a current of desired polarity and magnitude in said load.

14. An opto-electrical power transmission and control system as set forth in claim 13 wherein said means includes a first light source operatively arranged to illuminate said first receiver surface with incident light emitted at a desired intensity, and a second light source operatively arranged to illuminate said second receiver surface with incident light emitted at a desired intensity.

15. An opto-electrical power transmission and control system as set forth in claim 14 and further comprising a first optical fiber operatively arranged to direct light emitted by said first source to said first receiver surface, and a second optical fiber operatively arranged to direct light emitted by said second source to said second receiver surface.

16. An opto-electrical power transmission and control system as set forth in claim 14 wherein the light emitted by said first source is of one wave length, wherein the light emitted by said second source is of another wave length, and wherein a single optical fiber is operatively arranged to transmit light from both of said sources, and further comprising a first filter for separating light of said one wave length from the light in said fiber and for supplying such separated light to said first receiver surface, and a second filter for separating light of said other wave length from light in said fiber and for supplying such separated light to said second receiver surface.

17. An opto-electrical power transmission and control system for proportionally controlling the operation of an electric load in response to the intensity of light emitted from a source, comprising:
a power light source operatively arranged to selectively emit light at a controllable intensity;
a first photodiode having a first receiver surface arranged to be illuminated with light emitted by said power source and operative to produce an electrical output in response to such incident light;
an electric power-consuming load arranged to receive the output of said first photodiode, said load having an output proportional to input current, said load having a maximum impedance such that the maximum load input voltage required to produce the maximum desired load current does not exceed the forward conductive breakdown voltage of said first photodiode;
an electrically-operated switch interposed between said first photodiode and load for selectively causing the electrical output of said first photodiode to have a desired polarity;
a signal light source operatively arranged to selectively emit light at a controllable intensity;
a second photodiode having a second receiver surface arranged to be illuminated with light emitted by said signal source and operative to produce an electrical output in response to such incident light; and
a controller arranged to receive the electrical output from said second photodiode and to operate said switch in response to the light emitted by said signal source;
whereby the current in said load will have a magnitude substantially proportional to the intensity of light emitted by said power source, and will have a polarity determined by the light emitted by said signal source.

18. An opto-electrical power transmission and control system as set forth in claim 17, and further comprising:
a first optical fiber arranged to transmit light from said power source to said first photodiode receiver surface; and
a second optical fiber arranged to transmit light from said signal source to said second photodiode receiver surface.

19. An opto-electrical power transmission and control system as set forth in claim 18 wherein the output of said second photodiode is filtered.

20. An opto-electrical power transmission and control system as set forth in claim 18 wherein the electrical output of said second photodiode has two states.

21. An opto-electrical power transmission and control system as set forth in claim 20 wherein said controller will cause the current produced by said first photodiode to have one polarity if the output of said second photodiode is in one state, and the opposite polarity if said second photodiode is in the other state.

22. An opto-electrical power transmission and control system as set forth in claim 21 wherein said controller includes an operational amplifier, and wherein the power for operating said amplifier is derived from the electrical output of said second photodiode.

23. An opto-electrical power transmission and control system as set forth in claim 22 wherein said switch includes a bridge circuit including two pairs of cooperative switches, and wherein the operation of the first cooperative pair is controlled by the output of said amplifier.

24. An opto-electrical power transmission and control system as set forth in claim 22 and further comprising a rectifier operatively arranged between said second photodiode and said operational amplifier.

25. An opto-electrical power transmission and control system as set forth in claim 20 wherein the light emitted by said signal source is pulse-width-modulated.

26. An opto-electrical power transmission and control system as set forth in claim 18 wherein the magnitude of the electrical output of said first photodiode is the sole power supplied to said load.

27. The method of transmitting power to, and proportionally controlling operation of, and electric power-consuming load, the output of which is proportional to its input current, in response to the intensity of light emitted from a source, comprising the steps of:
  causing said source to selectively emit light;
  controlling the intensity of such emitted light;
  connecting the electrical outputs of two photodiodes in parallel with said load such that current produced by said photodiode will oppose one another in said load, said load having a maximum impedance such that the maximum load input voltage required to produce the maximum desired load current does not exceed the forward conductive breakdown voltage of either photodiode; and
  selectively illuminating the receiver surfaces of said photodiodes with such emitted light on a mutually-exclusive basis;
  thereby to control the polarity and magnitude of the output of said load.

28. The method of transmitting power to, and proportionally controlling the operation of, an electro-magnetic torque motor, the output of which is proportional to its input current, in response to the intensity of light emitted from a source, comprising the steps of:
  causing said source to selectively emit light;
  controlling the intensity of such emitted light;
  illuminating the receiver surface of a photodiode with such emitted light to produce and electrical signal;
  controlling the polarity of such electrical signal; and
  supplying such electrical signal to said torque motor, wherein the maximum torque motor input voltage due to resistive and inductive reactance required to produce the maximum desired torque motor current at the maximum torque motor coil temperature and the maximum torque motor control frequency does not exceed the forward conductive breakdown voltage of said photodiode;
  thereby to cause the magnitude of the output of said torque motor to be substantially proportional to the intensity of such emitted light.

29. The method as set forth in claim 28, and comprising the further step of:
  transmitting emitted light from said source to said receiver surface via an optical conductor.

* * * * *

UNITED STATES PATENT AND TRADEMARK OFFICE
CERTIFICATE OF CORRECTION

PATENT NO. : 4,998,294
DATED : March 5, 1991
INVENTOR(S) : Franklin J. Banks and Kenneth D. Garnjost It is certified that error appears in the above—identified patent and that said Letters Patent is hereby corrected as shown below:

Column 10;
Claim 9, line 3: "torque" should be -- torque motor --.

Column 13;
Claim 23, line 5: after "cooperative pair", -- is controlled by the input to said amplifier, and the operation of the second cooperative pair --, should be inserted.

Signed and Sealed this

Eighth Day of September, 1992

Attest:

DOUGLAS B. COMER

*Attesting Officer*   *Acting Commissioner of Patents and Trademarks*